(12) United States Patent
Wood

(10) Patent No.: US 9,890,773 B2
(45) Date of Patent: Feb. 13, 2018

(54) WOBBLE PISTON HAVING ANGLED COMPRESSION RING AND SPHERICAL PISTON CAP

(71) Applicant: MAT INDUSTRIES, LLC, Long Grove, IL (US)

(72) Inventor: Mark W. Wood, Cedar Grove, TN (US)

(73) Assignee: MAT INDUSTRIES, LLC, Long Grove, IL (US)

( * ) Notice: Subject to any disclaimer, the term of this patent is extended or adjusted under 35 U.S.C. 154(b) by 380 days.

(21) Appl. No.: 14/734,477

(22) Filed: Jun. 9, 2015

(65) Prior Publication Data
US 2015/0361971 A1 Dec. 17, 2015

Related U.S. Application Data

(60) Provisional application No. 62/010,864, filed on Jun. 11, 2014.

(51) Int. Cl.
| | |
|---|---|
| *F16J 9/00* | (2006.01) |
| *F04B 39/00* | (2006.01) |
| *F04B 39/04* | (2006.01) |
| *F16J 15/3224* | (2016.01) |
| *F16J 1/12* | (2006.01) |
| *F01B 9/02* | (2006.01) |
| *F16J 15/3228* | (2016.01) |

(52) U.S. Cl.
CPC .......... *F04B 39/0005* (2013.01); *F01B 9/026* (2013.01); *F04B 39/042* (2013.01); *F16J 1/12* (2013.01); *F16J 15/3224* (2013.01); *F16J 15/3228* (2013.01)

(58) Field of Classification Search
CPC .... F01B 9/026; F04B 39/0005; F04B 39/042; F16J 1/12
USPC .......................................................... 92/240
See application file for complete search history.

(56) References Cited

U.S. PATENT DOCUMENTS

| | | | | |
|---|---|---|---|---|
| 4,995,795 | A * | 2/1991 | Hetzel | F04B 39/0005 417/562 |
| 5,231,917 | A | 8/1993 | Wood | |
| 5,937,736 | A * | 8/1999 | Charpie | F16J 1/12 92/240 |
| 6,213,000 | B1 | 4/2001 | Wood | |
| 6,349,630 | B1 * | 2/2002 | Wood | F04B 39/0005 92/240 |
| 7,290,481 | B2 * | 11/2007 | Suzuki | F04B 39/0005 92/240 |

* cited by examiner

*Primary Examiner* — Michael Leslie
(74) *Attorney, Agent, or Firm* — Greer, Burns & Crain, Ltd.

(57) ABSTRACT

A wobble piston is provided to be used in an air compressor for providing compressed air, and includes a piston cap having a generally flat first plate and a peripheral edge extending downwardly from the first plate. A connecting support rod is connected to the piston cap, and a compression ring is clamped between the edge of the piston cap and the support rod in complementary fashion. Upon assembly between the cap and the support rod, the compression ring has an angled side wall that is bent upwardly inwardly at a predetermined obtuse angle relative to a longitudinal axis of a cylinder.

18 Claims, 5 Drawing Sheets

WOBBLE PISTON HAVING ANGLED COMPRESSION RING AND SPHERICAL PISTON CAP

CROSS-REFERENCE

This application claims priority of U.S. Provisional Application Ser. No. 62/010,864, filed Jun. 11, 2014 under 35 U.S.C. §119(e), which is incorporated herein by reference.

BACKGROUND

The present disclosure generally relates to oil free compressors, and more particularly relates to an air compressor having an air-cooled wobble piston with a flexible compressing ring.

Conventional oil free compressors use a wobble piston that is rigidly secured to a connecting rod for allowing the piston to wobble or rock in a cylinder with the connecting rod as the piston is reciprocated within the cylinder. At least one piston compression seal or ring is provided around a periphery of the piston for allowing the piston to tilt in the cylinder without losing an air-tight seal, and the sealing relationship is enhanced by providing a smooth coating on an inner surface of the cylinder. The air-tight seal, the smooth coating in the cylinder, and the material composition of the flexible compression ring reduce friction such that oil lubrication is not required. Several types of the wobble pistons are described in commonly assigned U.S. Pat. Nos. 5,231,917 and 6,213,000; both of which are incorporated by reference in their entirety.

In use, a compression chamber of the cylinder is repeatedly compressed on upward strokes of a piston head, and as a result, heat is generated when air or gas is compressed in the chamber. Effective cooling of the cylinder and the piston is important to enhance the service life of the compressor because the service life of many compressor components is degraded by heat. Although heat absorbed by the piston during the compression stroke is transferred from the piston top to air drawn into the cylinder during operation, conventional wobble pistons prevent sufficient cooling of the piston and the piston seal, thereby causing premature failure of the compressor.

Often, the air-cooled oil free compressors use the rocking or wobble piston having a flexible cup-shaped seal as a compression ring disposed around the periphery of the piston. An oil free compressor crankcase typically has an open frame connecting important components together for the air circulation. One or more cooling vents are provided for delivering air into the open frame for cooling the components, such as the piston, the compression ring, the cylinder, a valve plate, and motor windings. However, conventional cooling vents prevent efficient delivery of the cooling air into the open frame.

Another operational challenge of the conventional wobble piston is that, due to its geometry, the conventional compression ring is subject to fatigue stress, and causes loud noises and subsequent ring failure after extended use. A conventional piston cap has a radial outer surface or wall that is linear and substantially parallel to an operational axis of the wobble piston. The compression ring is formed around the piston cap into the cup-shaped seal or ring that is opened outwardly radially, and extended toward a valve plate, thereby allowing the in-cylinder pressure to force the ring outwardly radially toward the inner surface of the cylinder. During reciprocal movement of the piston, the compression ring is elastically deformed into the shape of an ellipse for maintaining a sealing contact with the inner surface of the cylinder. This repeated deformation of the compression ring causes premature structural failures, such as fractures and gaps in the ring.

Thus, there is a need for developing an improved wobble piston having enhanced cooling vents with larger openings, and a compression ring that provides reduced fatigue stress and noise, thereby extending the service life of the compressor.

SUMMARY

The present disclosure is directed to a wobble piston having an angled compression ring and a spherical piston cap. An important feature of the present piston is that a compression ring is provided around an outer periphery of the piston, wherein the ring is bent at a predetermined obtuse angle for reducing fatigue stress and failure of the ring. This configuration allows the use of thicker rings for high pressure operation, and harder ring materials for improving a ring wear rate. As described in greater detail below, due to the obtuse angle of the present ring, compared to conventional wobble piston configurations, an unsupported area below a bent portion of the ring is reduced, and thus lessens the fatigue stress during operation. The geometry of the bent portion of the present ring reduces a support width needed on a connecting support rod, and increases an available area for cooling vents in the rod. Larger cooling vents reduce temperatures of compression gas in the cylinder and adjacent components for improving component life and compressor efficiency.

Another important feature of the present piston is that a piston cap is provided having a spherical surface on an outer periphery of the piston cap such that a radial position of the piston is readily controlled as the piston tilts within the cylinder relative to a longitudinal axis of the cylinder. This configuration of the piston cap reduces the compression ring fatigue and related noises caused by the friction between the ring and the inner surface of the cylinder. Moreover, the spherical shape of the piston cap enhances the sealing contact of the ring with the inner surface of the cylinder as a rotating eccentric reciprocally moves the piston within the cylinder. Thus, this configuration more evenly distributes a piston radial load over the outer spherical surface of the piston cap so that the ring wear occurs more uniformly on a circumferential outer surface of the ring, rather than concentrating the wear on a top edge of the ring. As described in greater detail below, the present piston cap produces a more uniform ring wear pattern that reduces the wear rate, and increases the service life of the ring.

In one embodiment, a wobble piston is provided to be used in an air compressor for providing compressed air, and includes a piston cap having a generally flat first plate and a peripheral edge extending downwardly from the first plate. A connecting support rod is connected to the piston cap, and a compression ring is clamped between the edge of the piston cap and the support rod in complementary fashion. Upon assembly between the cap and the support rod, the compression ring has an angled side wall that is bent upwardly inwardly at a predetermined obtuse angle relative to a longitudinal axis of a cylinder.

In another embodiment, a wobble piston is provided to be used in an air compressor for providing compressed air, and includes a piston cap having a spherical radial outer surface on at least a portion of a side wall of the cap. The outer surface is closest to an inner surface of a cylinder. A compression ring is sandwiched between the spherical surface of the piston cap and the inner surface of the cylinder. The compression ring generally follows an outer contour of the spherical surface of the piston cap, and has an outer surface diameter that is substantially equal to a diameter of the cylinder, such that friction between an upper end of the compression ring and the inner surface of the cylinder is reduced during operation.

In yet another embodiment, a wobble piston is provided to be used in an air compressor for providing compressed air, and includes a piston cap having a spherical radial outer surface on at least a portion of a side wall of the cap. The outer surface is closest to an inner surface of a cylinder, and has a generally flat first plate and a peripheral edge extending downwardly from the first plate. A connecting support rod is connected to the piston cap. A compression ring is clamped between the edge of the piston cap and the support rod in complementary fashion, and is sandwiched between the spherical surface of the piston cap and the inner surface of the cylinder. The compression ring generally follows an outer contour of the spherical surface of the piston cap, and has an outer surface diameter that is substantially equal to a diameter of the cylinder, such that friction between an upper end of the compression ring and the inner surface of the cylinder is reduced during operation.

DETAILED DESCRIPTION

Figure 1:
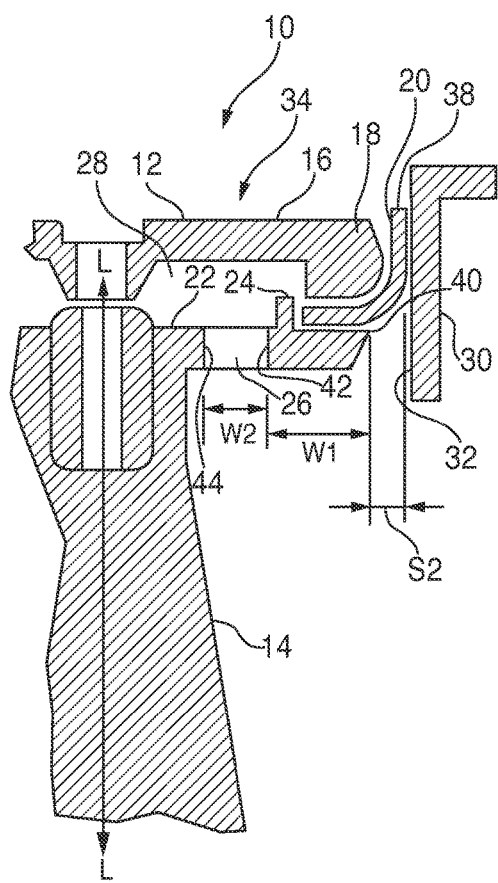
FIG. 1 is a schematic front partial vertical cross-section of an exemplary wobble piston having a conventional compression ring.

Referring now to FIG. 1, a first embodiment of an exemplary conventional wobble piston is generally designated 10 and is configured for providing compressed air to a pneumatic tool and other suitable equipment depending on different applications. Except where particularly noted, the drawing figures included in this disclosure are schematic and generally not drawn to scale. As discussed above, exemplary types of the conventional wobble pistons 10 are described in U.S. Pat. Nos. 5,231,917 and 6,213,000; both of which are incorporated by reference. Typically, the piston 10 includes a piston head or cap 12 and a connecting support rod 14, which are preferably cast from a strong light weight material, such as aluminum alloy, and are connected together using a fastener (not shown). The piston head 12 has a generally flat first plate 16 and a peripheral edge 18 depending from the first plate for clamping a cup-shaped compression ring 20 between the edge of the piston head and the support rod 14.

As is the case with the piston head 12, the support rod 14 has a generally flat second plate 22, and an annular lip 24 projecting upwardly from an upper surface of the second plate for securing the compression ring 20 from unwanted movement. At least one opening or air vent 26 is provided in the support rod 14 for circulating cooling air in a piston chamber 28 defined by the first and second plates 16, 22 such that the opening causes the cooling air to pass through the chamber as the piston 10 is reciprocated in a cylinder 30. During the reciprocating movement of the piston 10, the conventional compression ring 20 is maintained in contact with an inner surface 32 of the cylinder 30 for tightly sealing a compression chamber 34 of the cylinder above the piston head 12. Other types of compression or combustion chambers are also contemplated to suit different applications.

Figure 3A:
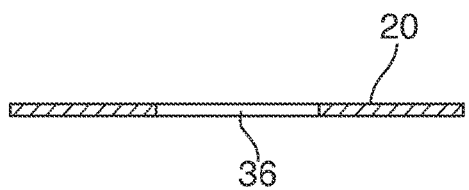
FIGS. 3A and 3B respectively show a schematic front vertical cross-section of the conventional compression ring of FIG. 1 before and after being bent into a cup shape.
Figure 3B:
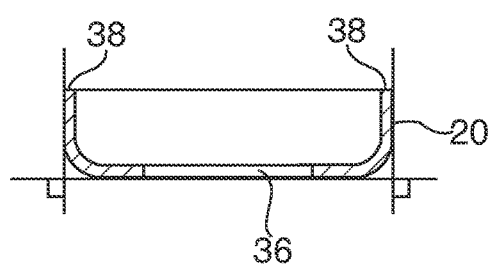

Referring now to FIGS. 1 and 3A-3B, the conventional compression ring 20 is initially flat (FIG. 3A), and has a central opening 36 configured for accommodating insertion of the annular flange 24 of the support rod 14. After the flat ring 20 is clamped between the edge 18 of the first plate 16 and the upper surface of the second plate 22, the ring is formed into a cup shape (FIG. 3B) by forcing the piston head 12 into the cylinder 30. Specifically, as the piston head 12 enters into the cylinder 30, an upper end 38 of the flat ring 20 is bent upwardly to form a substantially 90 degree bend relative to a longitudinal axis L of the cylinder for constructing the cup shape. However, as illustrated in FIG. 1, this configuration of the second plate 22 creates a wide ring support width W1, and a relatively narrow vent width W2 for providing cooling air circulation. The ring support width W1 refers to a width measured between an outer edge 40 of the second plate 22 and an outer end 42 of the vent 26. Also, the vent width W2 refers to a width measured between an inner end 44 of the vent 26 and the outer end 42 of the vent.

Figure 2:
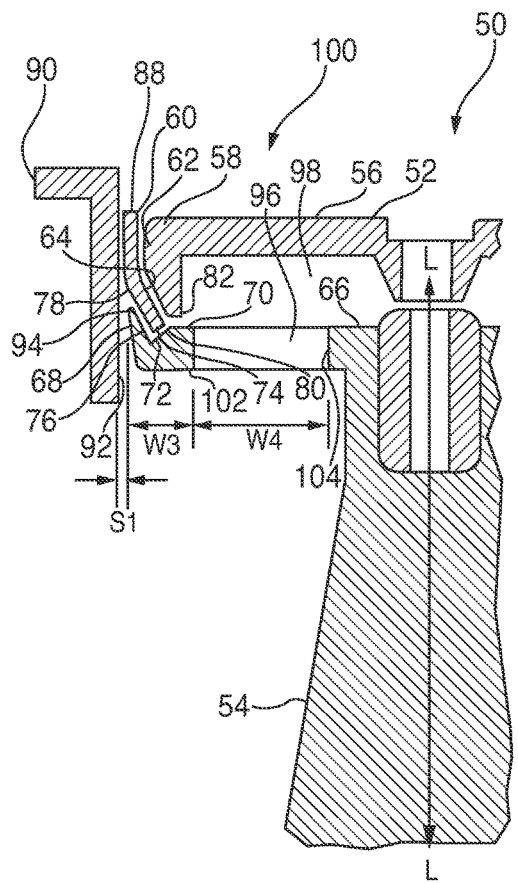
FIG. 2 is a schematic front partial vertical cross-section of the present wobble piston having an angled compression ring.

Referring now to FIG. 2, an exemplary improved wobble piston is generally designated 50. As is the case with the conventional wobble piston 10 (FIG. 1), the present wobble piston 50 includes a piston head or cap 52 and a connecting support rod 54. The piston head 52 has a generally flat first plate 56 and a peripheral edge 58 depending from the plate for clamping a cup-shaped compression ring 60 between the edge of the piston head and the support rod 54 in complementary fashion. An exemplary thickness of the present ring 60 is approximately 0.05 inch, which may vary to suit the application.

An important feature of the present piston cap 52 is that an outer face 62 of the first plate 56 covers and abuts substantially all of an inner surface 64 of the present ring 60. Similarly, with the piston head 52, the support rod 54 has a generally flat second plate 66, and an annular support portion 68 projecting upwardly from an upper surface 70 of the second plate for securing the present compression ring 60 from unwanted movement. An important feature of the support portion 68 is that the portion has an annular seat or groove 72 for receiving a lower end 74 of the present ring 60 such that the ring is securely seated and clamped between the first and second plates 56, 66.

More specifically, the seat 72 is preferably "L"-shaped, and includes a long leg 76 for abutting an outer surface 78 of the present ring 60, and a short leg 80 for supporting the lower end 74 of the ring, such that the ring is securely held in the seat in complementary fashion by the edge 58 of the first plate 56 and the support portion 68 of the second plate 66. In a preferred embodiment, an exemplary length of the short leg 80 is approximately 0.05 inch, which is substantially equal to or greater than the thickness of the present ring 60, but this length may vary to suit the application. Also, it is preferred that the long leg 76 extends at least approximately two to three times a thickness of the present ring 60 (e.g., 0.1-0.15 inch), but this length may vary depending on different applications. It is contemplated that when the present ring 60 is clamped by the peripheral edge 58 and the support portion 68, the upper surface 70 of the second plate 66 and a lower end 82 of the peripheral edge 58 are spaced at a predetermined distance without touching each other.

Figure 4A:
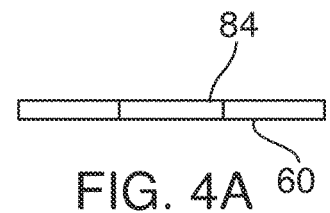
FIGS. 4A, 4B and 4C respectively show a schematic front vertical cross-section of the angled compression ring of FIG. 2 before and after being bent at a predetermined obtuse angle in the present wobble piston.
Figure 4B:
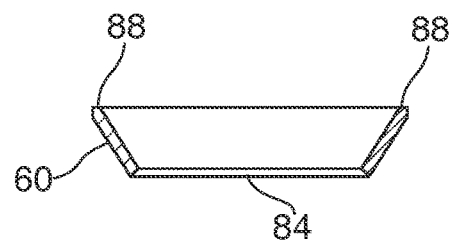
Figure 4C:
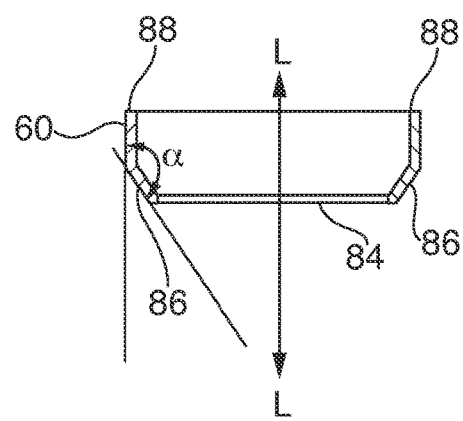

Referring now to FIGS. 2 and 4A-4C, like the conventional compression ring 20 (FIG. 3A), the present compression ring 60 is initially formed into a flat shape (FIG. 4A), having a central opening 84. During an installation process, the present compression ring 60 is placed between the support portion 68 of the second plate 66 and the edge 58 of the first plate 56, such that the central opening 84 is expanded for reforming the ring 60 into a truncated cone (FIG. 4B), and is configured for accommodating insertion of the second plate 66. An important feature of the present compression ring 60 is that the present ring is clamped between the edge 58 of the first plate 56 and the support portion 68 of the second plate 66, and the ring is formed into the cup shape having an angled side wall 86 (FIG. 4C).

Specifically, an upper end 88 of the present ring 60 is bent upwardly inwardly at a predetermined obtuse angle α (i.e., greater than 90° but less than 180°) when the ring is inserted into a cylinder 90, relative to a longitudinal axis L of the cylinder, for constructing the angled side wall 86. In a preferred embodiment, the obtuse angle α is approximately 130° relative to the axis of the cylinder 90; however, other suitable angles are contemplated depending on the application.

This configuration of the present ring 60 having the angled side wall 86 reduces an unsupported area S1 of present ring 60 for enhanced support on the bent portion of the angled side wall 86. More specifically, as comparably shown in FIGS. 1 and 2, the corresponding unsupported area S2 (FIG. 1) of the conventional ring 20 has a substantially larger unsupported area between the inner surface 32 of the cylinder 30 and the outer edge 40 of the second plate 22. In contrast, the unsupported area S1 (FIG. 2) of the present ring 60 has a substantially smaller unsupported area between an inner surface 92 of the cylinder 90 and an outer edge 94 of the second plate 66. Because the present ring 60 does not need to be bent toward its opposite ends by 90 degrees unlike the conventional ring 20 (FIG. 1), the present ring allows the use of thicker rings, which are also conducive to using harder enforcement materials for high pressure operations. It is contemplated that the harder ring materials include fiberglass, composite, and other suitable materials for reducing a ring wear rate.

Referring now to FIGS. 1 and 2, as similarly shown in the conventional piston 10 (FIG. 1), at least one opening or air vent 96 is provided in the second plate 66 of the piston rod 54 for circulating cooling air in a piston chamber 98 defined by the first and second plates 56, 66 such that the opening causes the cooling air to pass through the chamber as the present piston 50 is reciprocated in the cylinder 90. During the reciprocating movement of the present piston 50, the compression ring 60 is maintained in contact with the inner surface 92 of the cylinder 90 for tightly sealing a combustion chamber 100 of the cylinder above the piston head 52.

Accordingly, this configuration of the present ring 60 creates a narrow ring support width W3 for the present ring, and a wide vent width W4 for cooling air circulation. The ring support width W3 refers to a width measured between the outer edge 94 of the second plate 66 and an outer end 102 of the vent 96. Also, the vent width W4 refers to a width measured between an inner end 104 of the vent 96 and the outer end 102 of the vent. As comparably shown in FIGS. 1 and 2, it is appreciated that as the ring support width W3 decreases from the corresponding conventional width W1, the vent width W4 increases and becomes larger than the corresponding conventional width W2, thereby providing an improved ventilation of the cooling air. In a preferred embodiment, an exemplary diameter of the vent opening 96 is approximately 50% of an outer diameter of the second plate 66, but the diameter may vary to suit different applications.

Figure 5:
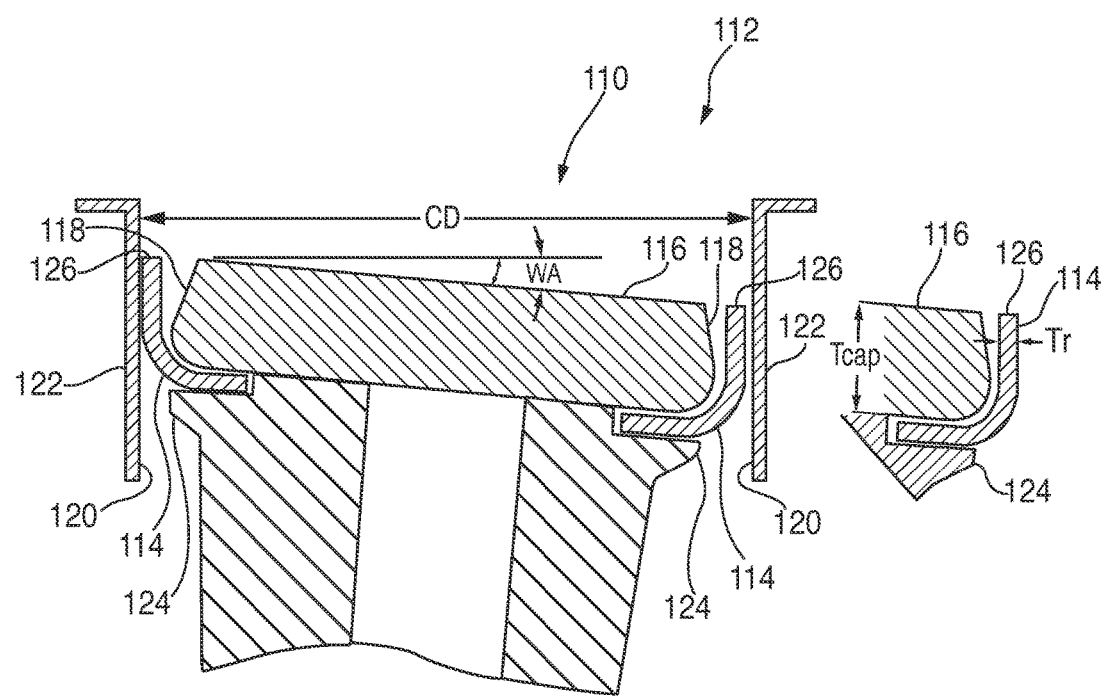
FIG. 5 is a schematic front vertical cross-section of the conventional wobble piston having a conventional piston cap.

Referring now to FIG. 5, a second embodiment of an exemplary conventional wobble piston is generally designated 110 and is configured for performing similar functions of the conventional wobble piston 10 shown in FIG. 1. As discussed above, several types of conventional wobble pistons, such as the piston 110, are commonly used in an oil free wobble piston (OFWP) compressor, generally designated 112. The OFWP compressor 112 is often preferred by users due to its low cost and oil free emission. However, disadvantages of the OFWP compressor 112 include a high noise level, a low efficiency, and a short service life of a flexible compression ring 114.

Typically, a conventional piston cap 116 has a radial outer surface or wall 118 that is linear and substantially parallel to a longitudinal axis of the wobble piston 110. In certain embodiments, the radial outer wall 118 is angled for providing clearance for high tilt angles generated by the piston 110. For illustration purposes, the angled wall 118 is exaggerated and not drawn to scale. As discussed above, the flexible compression ring 114 is formed into a cup shape opened upwardly toward a valve plate (not shown) for allowing an in-cylinder pressure to force the ring outwardly radially toward an inner surface 120 of a cylinder 122 during operation.

At the top and bottom piston positions within each cycle of the OFWP compressor 112, the piston 110 is axially aligned with the cylinder 122 for allowing the compression ring 114 to form a round shape. At these top and bottom positions, the compression ring 114 maintains a continuous seal with the inner surface 120 of the cylinder 122 without deforming the round shape of the ring, and a radial position of the piston 110 aligns with the longitudinal axis of the cylinder. However, as the piston 110 tilts during its cycle, the flexible compression ring 114 becomes deformed into an ellipse or oval shape for maintaining a sealing contact with the inner surface 120 of the cylinder 122. A continuous reshaping of the ring 114 between the round shape and the ellipse shape causes fatigue stress on the ring. Further, the piston 110 does not substantially align with the longitudinal axis of the cylinder 122 during the reshaping, and pulsates relative to the axis to repeatedly impact the inner surface 120 of the cylinder, causing loud noises.

When the piston 110 is positioned at its maximum tilt angle during a compression stroke, and thus the ring is at its maximum oval shape, a gap between the inner surface 120 of the cylinder 122 and a ring support region 124 is greatest. At this moment, the in-cylinder pressure is at or near its maximum value, and this condition creates a localized high stress region in the compression ring 114, thereby contributing to subsequent structural failure of the ring. Further, due to the tilting movement of the piston 110 during each cycle, the ring wear is typically concentrated on an upper end 126 of the ring 114. This non-uniform ring wear pattern is a main cause of premature ring failure in the OFWP compressor 112.

Figure 6:
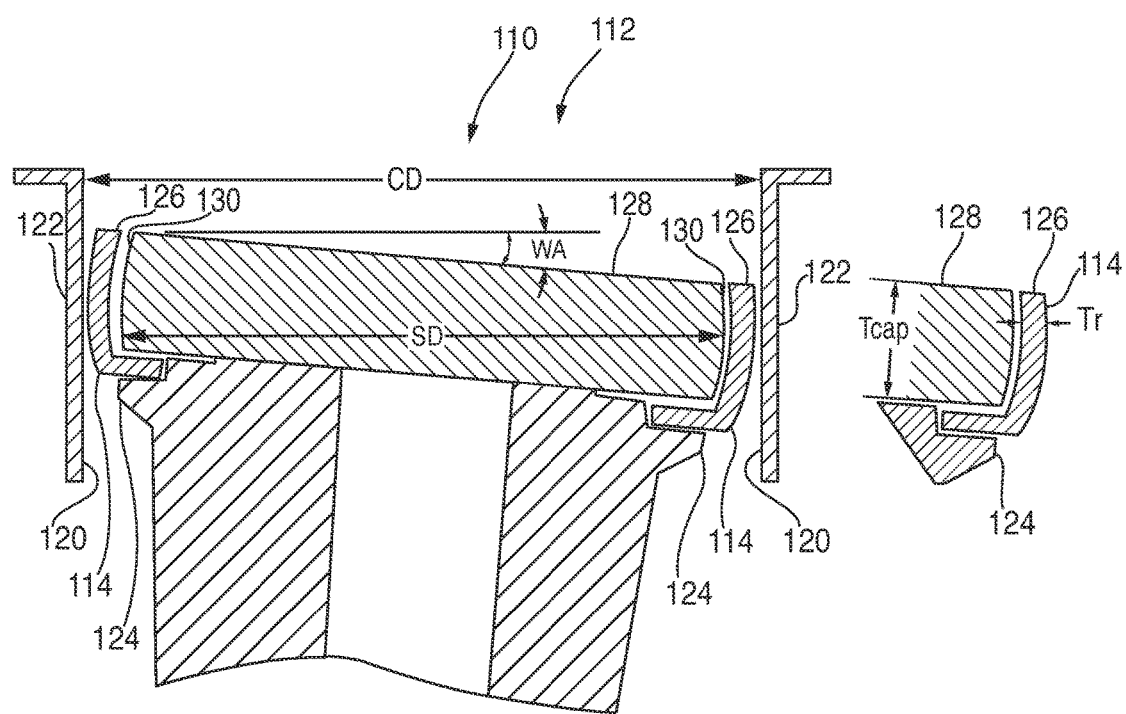
FIG. 6 is a schematic front vertical cross-section of the present wobble piston having a spherical piston cap.

Referring now to FIG. 6, unlike the conventional piston cap 116 having the linear radial outer wall 118 (FIG. 5), an exemplary improved piston cap 128 is shown, having a spherical radial outer surface or wall 130. It is contemplated that the features of the piston cap 128 are combinable with the features of the wobble piston 50. More specifically, the outer surface 130 of the present piston cap 128, being closest to the inner surface 120 of the cylinder 122, is spherical in shape. A flexible region near the upper end 126 of the ring 114 has a predetermined thickness Tr, and the ring is sandwiched between the spherical surface 130 of the cap 128 and the inner surface 120 of the cylinder 122. A diameter SD of the spherical surface 130 of the cap 128 is substantially equal to a length of a diameter CD of the cylinder 122 minus two times the predetermined thickness Tr of the ring 114. An important feature of the compression ring 114 is that the ring generally follows an outer contour of the spherical surface 130 of the cap 128, and has an outer surface diameter that is substantially equal to the cylinder diameter CD. A thickness Tcap of the present cap 128 and a height of the compression ring 114 are determined based on expression (2) shown below for providing a continuous seal between the cylinder 122, the ring 114, and the spherical surface 130 of the cap 128.

For example only, it is contemplated that the diameter SD of the spherical surface 130 of the cap 128 is determined based on the diameter CD of the cylinder 122 and the predetermined thickness Tr of the ring 114, and may be defined as provided by expression 1.

$$SD = CD - (2*Tr) \quad (1)$$

where SD is the diameter of the spherical surface 130 of the cap 128, CD is the diameter of the cylinder 122, and Tr is the thickness of the compression ring 114.

For example only, it is contemplated that the thickness Tcap is determined based on the diameter SD of the spherical surface 130 of the cap 128 and a wobble angle WA of the piston 110, and may be defined as provided by expression 2.

$$Tcap = SD * \sin\left(\frac{WA}{2}\right) \quad (2)$$

where Tcap is the thickness of the cap 128, and WA is the wobble angle of the wobble piston 110.

This configuration of the present piston cap 128 allows the compression ring 114 to maintain an effective, continuous sealing contact with the inner surface 120 of the cylinder 122 during each cycle of a compression process. Further, because the present compression ring 114 generally follows the outer contour of the spherical surface 130 of the cap 128, the upper end 126 of the ring is not substantially in direct contact with the cylinder 122. As a result, the ring wear is not concentrated on the upper end 126 of the ring 114, and produces a more uniform ring wear, thereby extending the service life of the ring.

Moreover, a spherical profile of the outer surface or side wall 130 of the present piston cap 128 and the ring 114 enhances the radial position of the piston 110 relative to the cylinder 122 during the compression process. Consequently, the alignment of the piston 110 is improved relative to the longitudinal axis of the cylinder 122, and pulsates less relative to the axis to impact the inner surface 120 of the cylinder. Thus, the associated noises are reduced, and the service life of the ring 114 is extended.

Figure 7:
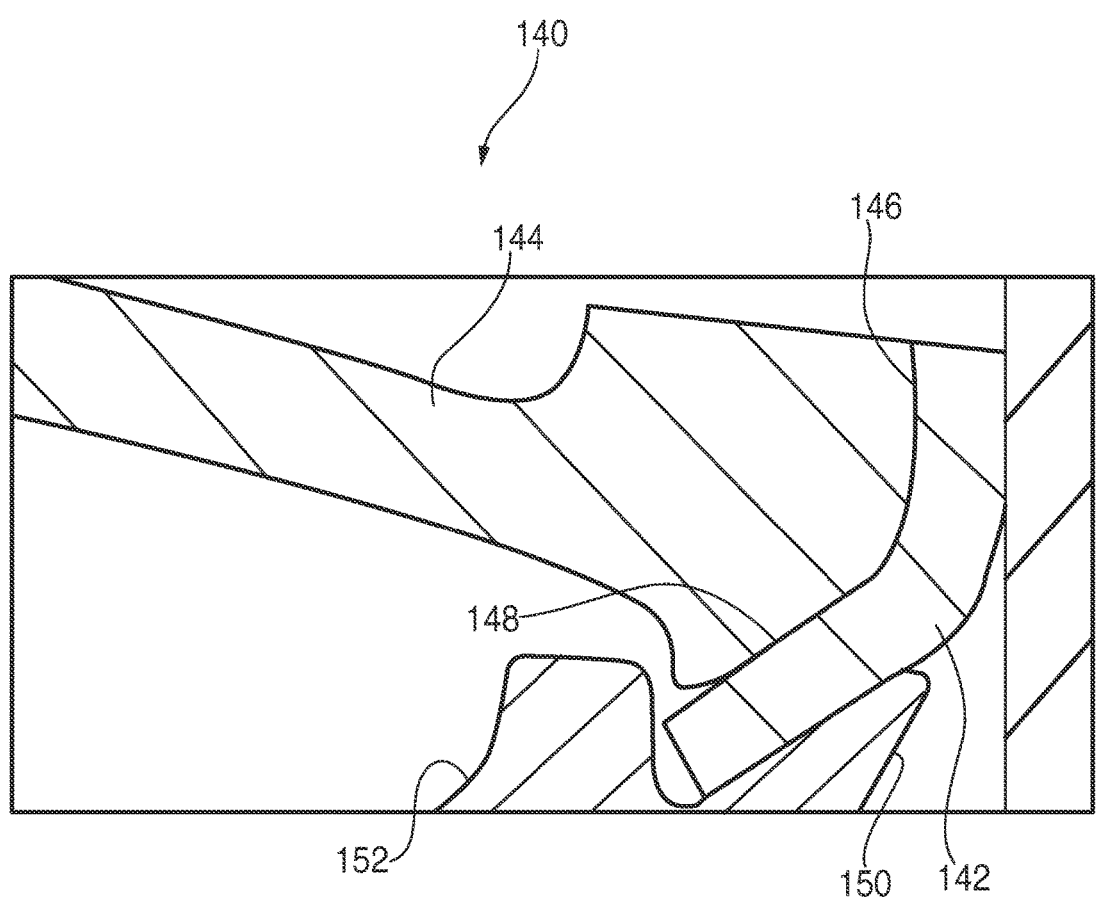
FIG. 7 is an enlarged schematic front vertical cross-section of the present wobble piston having the angled compressing ring and the spherical piston cap.

Referring now to FIG. 7, another exemplary wobble piston is generally designated 140, and has both an angled compressing ring 142 and a spherical piston cap 144. In a preferred embodiment, the wobble piston 140 has at least one of the angled compression ring 60 (FIG. 2) and the spherical piston cap 128 (FIG. 6) to suit the application. For example, the present piston 140 combines the angled compression ring 60 and the conventional piston cap 116 (FIG. 5), or the spherical piston cap 128 and the conventional compression ring 20 (FIG. 1) depending on different applications.

It is contemplated that the angled compression ring 60 of FIG. 2 is modified to conform to a peripheral profile of the spherical piston cap 128 of FIG. 6. More specifically, as shown in FIG. 7, an upper half of the present compression ring 142 generally follows an outer contour of a spherical radial outer surface 146 of the piston cap 144. However, a lower half of the present compression ring 142 is substantially linear such that the present ring 142 is securely clamped by a spherical peripheral edge 148 of the piston cap 144 and a support portion 150 of a connecting support rod 152 in a similar manner shown in FIG. 2. While approximately 50% (upper half) of the ring 142 forms a spherical shape, and the other 50% (lower half) of the ring is linear, any predetermined portion of the ring may be spherical or linear to suit the application. Likewise, any predetermined portion of the peripheral edge 148 of the piston cap 144 may be spherical or linear depending on different applications.

While a particular embodiment of the present invention has been described herein, it will be appreciated by those skilled in the art that changes and modifications may be made thereto without departing from the present disclosure in its broader aspects and as set forth in the following claims.

What is claimed is:

1. A wobble piston used in an air compressor for providing compressed air, comprising:
    a piston cap having a generally flat first plate and a peripheral edge extending downwardly from the first plate;
    a connecting support rod being connected to the piston cap;
    a compression ring being clamped between the edge of the piston cap and the support rod in complementary fashion;
    said peripheral edge of said piston cap forming a spherical radial outer surface as the piston is viewed from the side, said spherical radial outer surface extending a full height of said cap; and
    said compression ring being constructed and arranged for following said spherical radial outer surface.

2. The wobble piston of claim 1, wherein the support rod has a generally flat second plate, and an angled annular support portion projecting upwardly from an upper surface of the second plate for securing the compression ring.

3. The wobble piston of claim 2, wherein the support portion has an annular seat for receiving a lower end of the compression ring such that the ring is securely seated and clamped between the first and second plates.

4. The wobble piston of claim 3, wherein the ring is securely held in the seat in complementary fashion by the edge of the first plate and the support portion of the second plate.

5. The wobble piston of claim 3, wherein the seat includes a long leg for abutting an outer surface of the compression ring, and a short leg for supporting the lower end of the compression ring.

6. The wobble piston of claim 5, wherein the long leg extends at least approximately two to three times a length of a thickness of the compression ring.

7. The wobble piston of claim 5, wherein the short leg has a length that is substantially equal to or greater than a thickness of the compression ring.

8. The wobble piston of claim 2, wherein the upper surface of the second plate and a lower end of the peripheral edge of the first plate are spaced at a predetermined distance without touching each other.

9. The wobble piston of claim 2, wherein the compression ring has a central opening configured for accommodating insertion of the second plate.

10. The wobble piston of claim 1, wherein an outer face of the first plate covers and abuts substantially all of an inner surface of the compression ring.

11. The wobble piston of claim 1, wherein an upper end of the compression ring is bent upwardly inwardly at the predetermined obtuse angle of approximately 130° relative to the longitudinal axis of the cylinder.

12. A wobble piston used in an air compressor for providing compressed air, comprising:
- a piston cap having a spherical radial outer surface on at least a portion of a side wall of the cap, the outer surface being closest to an inner surface of a cylinder;
- a compression ring being operationally disposed between the spherical surface of the piston cap and the inner surface of the cylinder;
- the compression ring generally follows an outer contour of the spherical surface of the piston cap, and has an outer surface diameter that is substantially equal to a diameter of the cylinder; and
- wherein a diameter of the spherical surface of the piston cap is defined as:

$$SD = CD - (2*Tr)$$

wherein SD is the diameter of the spherical surface of the cap, CD is the diameter of the cylinder, and Tr is the thickness of the compression ring.

13. The wobble piston of claim 12, wherein a flexible region near the upper end of the compression ring has a predetermined thickness, and a diameter of the spherical surface of the piston cap is determined based on the diameter of the cylinder and the predetermined thickness of the ring.

14. The wobble piston of claim 12, wherein a thickness of the piston cap is determined based on a diameter of the spherical surface of the cap and a wobble angle of the piston.

15. The wobble piston of claim 12, wherein a thickness of the piston cap is defined as:

$$Tcap = SD * \sin\left(\frac{WA}{2}\right)$$

where Tcap is the thickness of the cap, SD is the diameter of the spherical surface of the cap, and WA is the wobble angle of the wobble piston.

16. The wobble piston of claim 12, wherein an upper half of the compression ring generally follows an outer contour of the spherical surface of the piston cap.

17. The wobble piston of claim 12, wherein a lower half of the compression ring is substantially linear, and a corresponding lower half of the side wall of the cap is substantially linear in complementary fashion.

18. A wobble piston used in an air compressor for providing compressed air, comprising:
- a piston cap having a spherical radial outer surface extending a full length of a side wall of the cap, as said piston is viewed from the side, the outer surface being closest to an inner surface of a cylinder;
- a connecting support rod being connected to the piston cap; and
- a compression ring being clamped between the edge of the piston cap and the support rod in complementary fashion, and being operationally disposed between the spherical surface of the piston cap and the inner surface of the cylinder,
- wherein the compression ring generally follows an outer contour of the spherical surface of the piston cap, and has an outer surface diameter that is substantially equal to a diameter of the cylinder.

* * * * *